(12) United States Patent
Ide et al.

(10) Patent No.: US 7,483,934 B1
(45) Date of Patent: Jan. 27, 2009

(54) METHODS INVOLVING COMPUTING CORRELATION ANOMALY SCORES

(75) Inventors: Tsuyoshi Ide, Kanagawa (JP); Spyridon Papadimitriou, White Plains, NY (US)

(73) Assignee: International Busniess Machines Corporation, Armonk, NY (US)

( * ) Notice: Subject to any disclaimer, the term of this patent is extended or adjusted under 35 U.S.C. 154(b) by 0 days.

(21) Appl. No.: 11/959,073

(22) Filed: Dec. 18, 2007

(51) Int. Cl.
*G06F 17/15* (2006.01)
(52) U.S. Cl. ..................................... 708/422
(58) Field of Classification Search .......... 708/422–426
See application file for complete search history.

(56) References Cited

U.S. PATENT DOCUMENTS

| | | | | |
|---|---|---|---|---|
| 4,621,365 | A * | 11/1986 | Chiu ........................... | 708/422 |
| 5,257,364 | A * | 10/1993 | Melamed et al. ............ | 708/426 |
| 5,267,271 | A * | 11/1993 | Rice ............................ | 708/422 |
| 2005/0143976 | A1 | 6/2005 | Steniford | |
| 2005/0283511 | A1* | 12/2005 | Fan et al. .................... | 708/306 |
| 2006/0161592 | A1 | 7/2006 | Ertoz et al. | |
| 2007/0005256 | A1* | 1/2007 | Lincoln et al. ................ | 702/19 |
| 2007/0214133 | A1* | 9/2007 | Liberty et al. .................. | 707/5 |

OTHER PUBLICATIONS

Kenji et al., Dynamic Syslog Mining for Network Failure Monitoring, Aug. 21-24, 2005, ACM, pp. 499-508.*
J. Goldberger, S. Roweis, G. Hinton and R. Salakhutdinov. Neighbourhood Components Analysis, In Advances in Neural Information Processing Systems, 2005, pp. 513-520.

* cited by examiner

*Primary Examiner*—Chat C Do
(74) *Attorney, Agent, or Firm*—Cantor Colburn LLP; Vazken Alexanian

(57) ABSTRACT

An exemplary method for computing correlation anomaly scores, including, defining a first similarity matrix for a target run of data, the target run of data includes an N number of sensors, defining a second similarity matrix for a reference run of data, the target run of data includes the N number of sensors, developing a k-neighborhood graph $N_i$ of the i-th node for the target run of data, wherein the k-neighborhood graph of the i-th node is defined as a graph comprising the i-th node and its k-nearest neighbors (NN), developing a k-neighborhood graph $\overline{N}_i$ of the i-th node for the reference run of data, defining a probability distribution p(j|i), wherein p(j|i) is the probability that the j-th node becomes one of the k-NN of the i-th node, coupling the probability between the i-th node and the neighbors of the i-th node, determining an anomaly score of the i-th node, and determining whether the target run of data has changed from the reference run of data responsive to determining the anomaly score of the i-th node.

1 Claim, 2 Drawing Sheets

METHODS INVOLVING COMPUTING CORRELATION ANOMALY SCORES

BACKGROUND OF THE INVENTION

Field of the Invention

This invention relates generally to a method for computing correlation anomaly scores and, more specifically, to a method for computing correlation anomaly scores using change analysis.

DESCRIPTION OF BACKGROUND

Change detection is an unsupervised learning task that decides whether a data generating mechanism behind data has been changed or not When considering multivariate systems, however, more advanced tasks involving anomaly or change detection are also relevant. After detecting a change, it is desirable to determine which variables (or, degrees of freedom) are responsible for the change. Determining which variables are responsible for a change is called change analysis. Change analysis can be achieved by comparing a target data set with some reference data based on predefined criteria. If the degrees of freedom are independent of each other, change analysis amounts to change detection of individual degrees of freedom. However, degrees of freedom are not usually independent in general, and the dependence makes change analysis challenging.

It is desirable for a method of computing correlation anomaly scores to be effective in multivariate systems having highly correlated degrees of freedom.

SUMMARY OF THE INVENTION

The shortcomings of the prior art are overcome and additional advantages are achieved through an exemplary method for computing correlation anomaly scores, the method including, defining a first similarity matrix for a target run of data, wherein the target run of data includes an N number of sensors, defining a second similarity matrix for a reference run of data wherein the target run of data includes the N number of sensors, developing a k-neighborhood graph $N_i$ of the i-th node for the target run of data, wherein the k-neighborhood graph of the i-th node is defined as a graph comprising the i-th node and its k-nearest neighbors (NN), developing a k-neighborhood graph $\overline{N}_i$ of the i-th node for the reference run of data, defining a probability distribution p(j|i), wherein p(j|i) is the probability that the j-th node becomes one of the k-NN of the i-th node, coupling the probability between the i-th node and the neighbors of the i-th node, determining an anomaly score of the i-th node, and determining whether the target run of data has changed from the reference run of data responsive to determining the anomaly score of the i-th node.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Systems and methods involving computing correlation anomaly scores are provided. Several exemplary methods are described.

In this regard, multivariate systems having highly correlated degrees of freedom can be naturally represented as graphs. Computing correlation anomaly scores may be described as: given two different graphs with nodes, providing the score of each node based on how much the node is responsible for the difference between the graphs.

An exemplary application addresses cases where the nodes are given by time-series data from physical sensors. An adjacency matrix (or the similarity matrix between sensors) can be changed over time, and the comparison is made for graphs at different time points.

Figure 1:
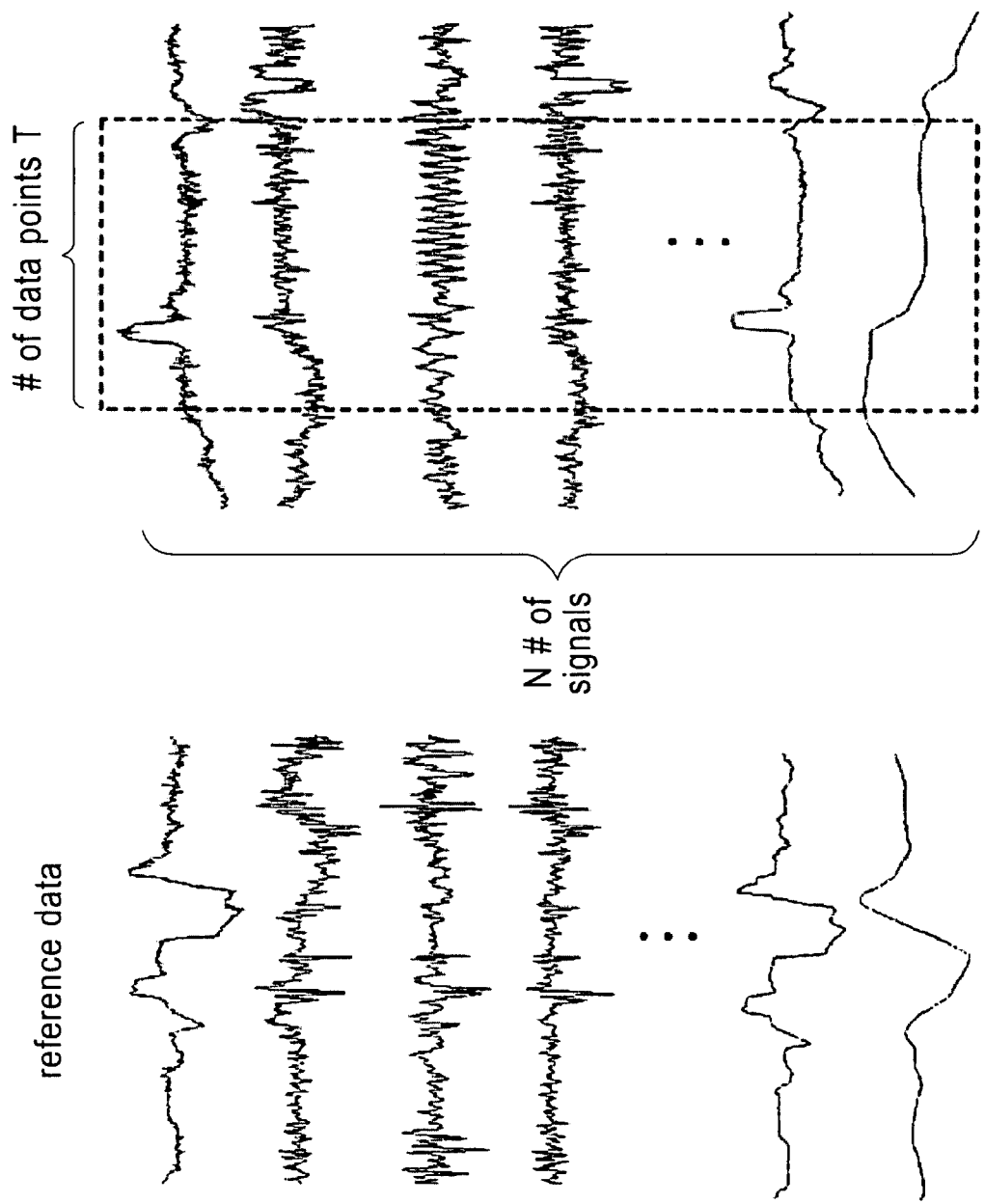
FIGS. 1A and 1B illustrate examples of graphical sensor data.

One exemplary application of computing correlation anomaly scores is in sensor validation, where sensor signals are inspected for detecting proper operation. FIG. 1B illustrates an example of a target run of a plurality of N sensors. FIG. 1A illustrates a reference data set. Sensor validation is an unsupervised learning fashion because of the following assumptions regarding the input data from the sensors: first, the signals are highly dynamic, so that time alignment between two different data sets will lead to meaningless results. Second, the signals are highly correlated, so that individual analysis of each sensor can overlook interesting anomalies. Third, supervised information about the behavior of each sensor is generally not given.

To compute correlation anomaly scores, an unknown structure hidden deep inside of graphs should be determined, and the correlation between the nodes should be unfolded. An exemplary method for computing correlation anomaly scores between sensor signals is based on a notion of neighborhood preservation: under normnal system operation, a neighborhood graph of each node is almost invariant against the fluctuations of experimental conditions. The exemplary method computes anomaly scores by evaluating how much this assumption is broken. The score can be obtained as a probability value by considering a canonical distribution on the neighborhood graph.

Referring to FIGS. 1A and 1B, the graphs represent an example of a dynamic system having N physical sensors such as, for example, pressure, acceleration, and luminance sensors. Each sensor produces real-valued time-series data. In either online or batch analysis, it is assumed that a target data set is given as N signals with T time points. The data unit is an experimental run. It is assumed that the measurements are done synchronously with a fixed frequency. If the measurements are not done synchronously with a fixed frequency, resampling or interpolation may be performed as a preprocess.

In a single run, let $x_i^{(t)}$ be the observation of the i-th sensor (i=1, 2, ..., N) at a time index t (t=1, 2, ..., T). The given data of a target run, which is expected to have some anomalies is shown in FIG. 1B. Computing the anomaly score of each sensor may be accomplished by comparing the target run with a reference run shown in FIG. 1A.

There are at least two considerations regarding comparing the target run with the reference run. First, in highly dynamic systems such as automobiles and computer systems, direct comparison by overlapping between individual target and reference signals is generally meaningless. FIGS. 1A and 1B show several examples of sensor signals of an automobile. The apparent behavior of the signals is different between the target and reference runs. This is because all of the degrees of freedom in complex systems such as an automobile cannot be controlled. A feature extraction technique that allows removal a majority of data fluctuations is used.

The second consideration regarding comparing the target run with the reference run is that most of the nontrivial anomalies are related to the correlations between signals. Generally, errors that occur in individual sensors are not difficult to detect. For example, a dead sensor can be easily detected by using a threshold value. However, if, for example, two working sensors have been exchanged by some human error in wiring, the error would appear primarily as a correlation anomaly. Since the anomaly score is computed for individual sensors, unknown correlations between signals are "unfolded".

Correlation anomaly analysis is defined as: given a target graph having A and a reference graph having $\bar{A}$, provide a score of each node which accounts for the difference between the graphs. Wherein, A and $\bar{A} \in R^{N \times N}$ are the similarity matrices of target and reference runs, respectively. Hereafter the bar () represents the corresponding quantity of a reference run.

The dissimilarity between graph nodes may be computed from the similarity matrix A. A k-neighborhood graph of the i-th node is defined as a graph comprising the i-th node and its k-NNs, with edges between the i-th node and its neighbors. Wherein, $d_{ij}$ is the dissimilarity between the i-th and the j-th nodes. A node j is the nearest neighbor (NN) to another node i if j satisfies $j = \operatorname{argmin}_{j'(\neq i)} d_{ij'}$. Similarly, the k-th NN of the i-th node is defined as the one which has the k-th smallest dissimilarity to i (except for i itself). The i-th node is the central node in the k-neighborhood graph of the i-th node.

Most of the unimportant fluctuations in a highly dynamic system are due to weakly correlated pairs of sensors. Conversely, highly correlated pairs of sensors tend to be hardly affected by the change in experimental conditions, under normal system operation. These observations lead to the neighborhood preservation principle for the correlation anomaly analysis. The neighborhood preservation principle recites: if the system is working normally, the neighborhood graph of each node is almost invariant against the fluctuations of experimental conditions.

The dissimilarity $d_{ij}$ between the i-th and j-th node is defined so as to satisfy the following conditions. (1) $d_{i,i} = 0$ for $\forall_i$, (2) $d_{ij} \approx 0$ for highly-correlated pairs, and (3) $d_{ij} \to \infty$ for almost uncorrelated pairs. Regarding the difference between the second and the third conditions, a large correlation coefficient may be considered as a representation of the internal structure of the system. On the other hand, a value of small correlation coefficients is considered to carry no useful information of the system. Mathematically, the dissimilarity is defined by $$d_{ij}^2 = \phi(a_{ij})$$

Where $a_{ij}$ represents the (i,j) element of A, and $\phi(x)$ is a monotonically decreasing positive function satisfying $$\phi(x) \to 0, \, |x| \to 1, \text{ and}$$

$$\phi(x) \to \infty, \, |x| \to 0$$

For example. if $a_{ij}$ is the correlation coefficient between the i-th and the j-th signals which satisfies $|a_{ij}| \leq 1$, $\phi(x) = \log|x|$ satisfies these conditions.

Figure 2:
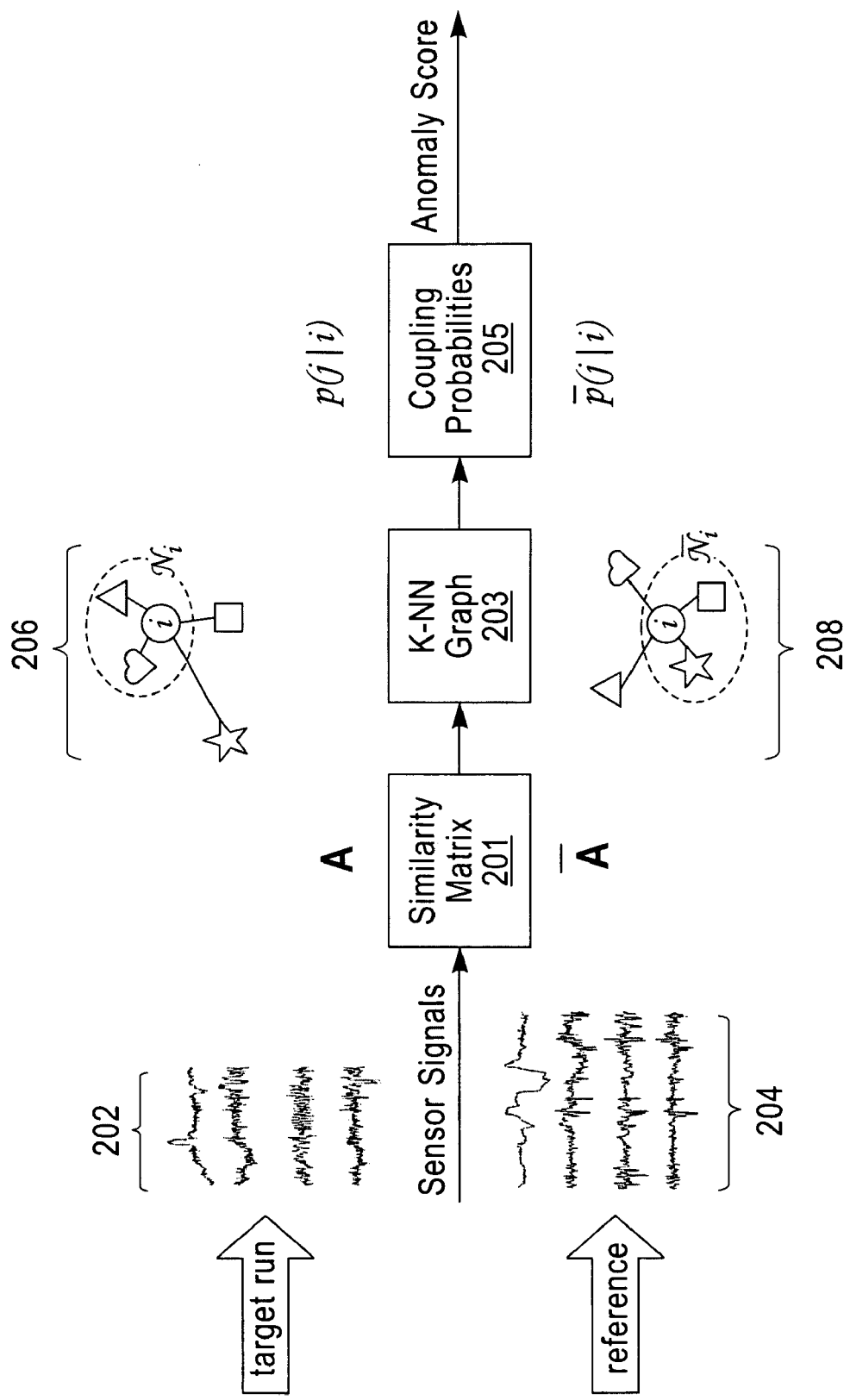
FIG. 2 illustrates a flow chart of an exemplary method involving computing correlation anomaly scores.

FIG. 2 illustrates a flow chart of the exemplary method of comparing a target run with a reference run. A target run of data is represented by sensor target signals 202, and a reference run set of data is represented by sensor reference signals 204. The sensor target signals 202 and the sensor reference signals 204 are converted into similarity matrices A and $\bar{A}$ respectfully in block 201.

In block 203 neighborhood graphs are developed. Two examples of neighborhood graphs target run graph 206 and reference run set of data graph 208. As shown in FIG. 2, $N_i$ and $\bar{N}_i$ are the sets of the k-NN with respect to the i-th node in the target and reference runs, respectively. In block 205, the coupling probabilities are determined to evaluate the difference of the neighborhood graphs between the target and reference runs. The probability distribution p(j|i) is defined on a neighborhood graph at the i-th node, where p(j|i) is the probability that the j-th node becomes one of the k-NN of the i-th node. The formulation includes non-zero p(j|i) that corresponds to the probability that the i-th node has no coupling with the neighbors of the i-th node. Thus, to quantitatively evaluate the change between the k-neighborhood graphs, the neighborhood is treated stochastically. In the k-neighborhood graph, let p(j|i) be the coupling probability of the j-th node with the i-th node. For each i, the normalization condition is given by $$\sum_{j \in N_i^+} p(j \mid i) = 1, \tag{4}$$

where $N_i^+$ defines the set of $N_i \cup i$. Similarly, $\overline{N_i^+} \equiv \overline{N_i} \cup i$. The self-coupling probability p(i|j) is included in Eq. (4). This term corresponds to the probability that the central node has no coupling with the neighbors of the central node.

By definition of coupling probability between nodes, p(j|i) should take a large value in a node with a small dissimilarity $d_{ij}$. On the other hand, the probability distribution over j should be as general as possible in terms of entropy. Thus, the distribution p(i↑i) is defined as the solution of the following optimization problem.

$$\min H_i \text{ such that } \langle d_i^2 \rangle = const., \sum_{j \in N_i^+} p(j \mid i) = 1, \tag{5}$$

where $H_i$ is the entropy of the probability distribution p(j|i), and is defined by $$H_i \equiv -\sum_{j \in N_i^+} p(j \mid i) \ln p(j \mid i). \tag{6}$$

The symbol $\langle d_i^2 \rangle$ represents the expected squared dissimilarity around the i-th node, which is defined by $$\langle d_i^2 \rangle \sum_{j \in N_i^+} d_{i,j}^2 p(j \mid i).$$

By introducing Lagrange's multipliers $2\sigma_i^2$ and $\mu_i$, the optimization problem is reduced to that of $$\sum_{j \in N_i^+} d_{i,j}^2 p(j \mid i) - 2\sigma_i^2 H_i - \mu_i \sum_{j \in N_i^+} p(j \mid i).$$

Inserting the definition of $H_i$, and differentiating with respect to p(j|i), results in $$p(j \mid i) = \frac{1}{Z_i} \exp\left(-\frac{d_{ij}^2}{2\sigma_i^2}\right), \quad (7)$$

where $\mu_i$ is removed by introducing the partition function $Z_i$, which is defined by $$Z_i \equiv \sum_{l \in N_i^+} \exp\left(-\frac{d_{ij}^2}{2\sigma_i^2}\right), \quad (8)$$

The multiplier $\sigma_i$ is to be determined by the condition about $\langle d_i^2 \rangle$. This can be treated as an input parameter, which is independent of i. Also, by modifying the definition of $\phi$ accordingly, the relation may be fixed as $2\sigma_i^2 = 1$. This relation is used hereafter.

Equation (7), may be further explained by considering what happens if a node is almost uncorrelated with other nodes. In this case, since p(i|i)>>p(j|i) for j≠i, the probability weight concentrates at the central node i. Thus, p(j|i) is capable of naturally discounting loosely correlated neighbors. The self-coupling probabilities in the normalization equation (4). As a result, they tend to give unstable results since $Z_i$ can be very small for isolated nodes.

According to the neighborhood preservation principle, the difference between the following quantities should be small if the system is working correctly.

$$e_i(N_i) \equiv \sum_{j \in N_i} p(j \mid i) \quad (9)$$

$$\bar{e}_i(N_i) \equiv \sum_{j \in N_i} \bar{p}(j \mid i) \quad (10)$$

Equations (9) and (10) represent the tightness of the i-th neighborhood graph. Thus, $e_i$ measures the tightness of the coupling between the central node and its neighbors in a target run in terms of probability. Also, $\bar{e}_i(N_i)$ measures the tightness of the coupling around the i-th node in a reference run using the k-NN set defined in the target set (i.e. not using the NN set of the reference data). For defining $\bar{e}_i(N_i)$ (as well as $e_i(\bar{N}_i)$), assume a one-to-one correspondence of sensor identities between target and reference runs.

Similarly, by replacing $N_i$ with $\bar{N}_i$, $e_i(\bar{N}_i)$ and $\bar{e}_i(\bar{N}_i)$ can be defined. Resulting in $$0 \leq e_i \leq \frac{k}{k+1} \quad (11)$$

The same holds for $\bar{e}_i$. The minimum is obtained when the i-th node is totally uncorrelated to others, and the maximum is obtained when the nodes are perfectly correlated.

Using the tightnesses, an anomaly score of the i-th node is defined as $$\max\{|e_i(N_i) - \bar{e}_i(N_i)|, |e_i(\bar{N}_i) - \bar{e}_i(\bar{N}_i)|\}. \quad (12)$$

The anomaly score is determined after the coupling probabilities in block 205 of FIG. 2. This is called an E-score, and analysis based on the E-score is called an E-test hereafter. The E-score is given by the difference between probabilities, having the same bound as Eq. (11). This feature makes interpretation of the E-score clear. However, a threshold value should be used for decision-making on sensors. If there are a number of instances of decisions and scores, the threshold can be determined using standard techniques such as the logistic regression in principle.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for detecting an error operation of physical sensors in a system, the method comprising:
   defining a first similarity matrix for a target run of data, wherein the target run of data includes data obtained from an N number of physical sensors in the system;
   defining a second similarity matrix for a reference run of data, wherein the reference run of data includes data obtained from the N number of physical sensors in the system;
   developing a k-neighborhood graph $N_i$ of the i-th node for the target run of data, wherein the k-neighborhood graph of the i-th node is defined as a graph comprising the i-th node and its k-nearest neighbors (NN);
   developing a k-neighborhood graph $\bar{N}_i$ of the i-th node for the reference run of data;
   defining a probability distribution p(j/i), wherein p(j/i) is the probability that the j-th node becomes one of the k-NN of the i-th node;
   summing the probabilities between the i-th node and the neighbors of the i-th node;
   determining an anomaly score of the i-th node from the sum of the probabilities;
   wherein the anomaly score is defined as $\max\{|e_i(N_i)|, |e_i(\bar{N}_i) - \bar{e}_i(\bar{N}_i)|\}$, wherein $e_i(N_i)$ is the sum of the probabilities of the target data as a function of the target data, $\bar{e}_i(N_i)$ is the sum of the probabilities of the reference data as a function of the target data, $e_i(\bar{N}_i)$ is the sum of the probabilities of the target data as a function of the reference data, and $\bar{e}_i(\bar{N}_i)$ is the sum of the probabilities of the reference data as a function of the reference data;
   determining whether the target run of data has changed from the reference run of data responsive to determining the anomaly score of the i-th node;
   comparing the anomaly score of the i-th node with a threshold value to determine whether the anomaly score of the i-th node exceeds the threshold value responsive to determining that the target run of data has changed from the reference run of data; and
   outputting the anomaly score responsive to determining that the anomaly score of the i-th node exceeds the threshold value, wherein the output anomaly score is indicative of the error operation in the physical sensors of the system.

* * * * *